United States Patent [19]

Doelling

[11] Patent Number: 4,967,486
[45] Date of Patent: Nov. 6, 1990

[54] MICROWAVE ASSISTED FLUIDIZED BED PROCESSOR

[75] Inventor: Michael K. Doelling, New City, N.Y.

[73] Assignee: Glatt GmbH, Binzen/Lorrach, Fed. Rep. of Germany

[21] Appl. No.: 367,766

[22] Filed: Jun. 19, 1989

[51] Int. Cl.$^5$ ............................................. F26B 3/34
[52] U.S. Cl. ...................................... 34/1; 34/57 A; 219/10.55 R
[58] Field of Search ............. 34/1, 57 R, 57 A; 219/10.55 R, 10.55 A, 10.55 F, 10.55, 10.55 M

[56] References Cited

U.S. PATENT DOCUMENTS

| | | |
|---|---|---|
| 3,235,971 | 2/1966 | Tooby . |
| 3,528,179 | 9/1970 | Smith . |
| 3,555,693 | 1/1971 | Futter ........................................ 34/1 |
| 3,771,234 | 11/1973 | Forster et al. . |
| 4,037,071 | 7/1977 | Kaufman, Jr. et al. ...... 219/10.55 F |
| 4,055,001 | 10/1977 | Forster et al. . |
| 4,126,945 | 11/1978 | Manser et al. . |
| 4,222,176 | 9/1980 | Tjurin et al. . |
| 4,488,362 | 12/1984 | Grassmann . |
| 4,694,133 | 9/1987 | Le Viet . |
| 4,714,812 | 12/1987 | Haagensen et al. . |

OTHER PUBLICATIONS

"Microwave Fluidized Bed Dryer", Microwave Power Symp., 10th Annu. Proc. Univ. of Waterloo, Ont., May 28-30, M. A. Rzepecka, M. A. Humid, 5/75, pp. 297-299.

Primary Examiner—Henry A. Bennet
Assistant Examiner—John Sollecito
Attorney, Agent, or Firm—Fleit, Jacobson, Cohn, Price, Holman & Stern

[57] ABSTRACT

A microwave assisted fluidized bed processor, comprising a fluidized bed vessel and a microwave generating means for providing microwave energy into the fluidized bed vessel. The fluidized bed vessel defines a microwave cavity for enabling variously-oriented, reflected microwaves to be produced within the cavity. The cavity defines an electrical continuum with appropriate microwave security screening means to enable all the microwave energy to be confined within the cavity.

18 Claims, 7 Drawing Sheets

MICROWAVE ASSISTED FLUIDIZED BED PROCESSOR

BACKGROUND OF THE INVENTION

1. Field of the Invention

The present invention relates to a fluidized bed processor such as a fluidized bed dryer, coater, or agglomerator utilizing the application of microwave energy. A microwave generator is connected with a fluidized bed processor to direct microwave energy into the region of fluidization in variously-oriented directions to create a plurality of standing wave modes within the processor through which the fluidized particles move in random directions.

2. Description of the Prior Art

Fluidized bed processors, of the batch type, are well known in the prior art. Such fluidized bed processors are used for a variety of drying, coating and agglomerating operations. The fluidized bed processors include a fluidized bed vessel having a fluidizing gas inlet and a fluidizing gas outlet to enable the gas to fluidize the product being treated. One such fluidized bed processor, particularly useful for laboratory operations, is the Uni-Glatt (TM) processor wherein the fluidized bed vessel includes a product container, or loading bowl, for receiving the product to be treated, an expansion chamber disposed immediately above the product container, and a filter chamber connected to the opposite end of the expansion chamber. A product retaining screen is provided at the bottommost end of the product container to support the product to be fluidized and defines an air inlet for allowing the fluidized gas to be directed upwardly to fluidize the product to be treated. The gas is drawn upwards through the vessel and exits the fluidizing gas outlet at the upper region of the filter chamber. The fluidized bed is formed within the product container and the expansion chamber. The filter chamber includes filters for catching any particles that may be blown upwards and includes a mechanical shaking apparatus or other means to shake or vibrate the filter bag to remove any particles embedded therein during the operation. When the product treatment is completed, the processor fans are stopped, the product container is disconnected from the expansion chamber, and the treated product is removed.

Fluidized bed processing, such as fluidized bed drying, has certain disadvantages. The fluidizing gas, typically heated air, serves to evaporate moisture from the particle surface. The drying time is dependent upon the mass of air flow and the amount of energy absorbed into the particulate material. During the initial stages of drying, moisture is evaporated from the surface of the particles relatively rapidly. However, the drying time falls after the surface moisture is removed. During this second phase of drying, water or moisture removal is dependent upon capillary or diffusional action. This requires increasingly more energy as the percent of moisture decreases or, stated otherwise, as the distance from the dried surface to the moisture increases. The product, which is usually a poor heat conductor, requires greater and greater energy input (higher temperatures) to maintain an adequate level of heat transfer to drive the liquid out to the surface of the particles. Thus, in the later stage of fluidized bed drying, the drying rate falls due to the relatively poor energy efficiency.

The use of fluidized bed dryers, in combination with microwave energy sources are known in the art. See, for example, U.S. Pat. Nos. 3,528,179 and 4,126,945. These systems seek to take advantage of microwave energy which penetrates, to a great extent, into the product. Microwave energy serves to drive the moisture in the center of the product to be treated toward the surface. Once driven to the surface, the fluidizing gas provides for removal of the evaporating surface moisture.

The above-mentioned prior art patents that utilize microwave energy provide that the fluidizing bed vessel be shaped in the form of a waveguide, i.e., a traveling wave applicator. Situated substantially in the center of the waveguide, or slightly below the center-line of the waveguide, is a product retaining screen which supports the product to be fluidized. Microwave energy is applied at one end of this waveguide and microwaves are propagated both above and below the product screen along the length of the waveguide. The opposite end of the waveguide includes load tubes to absorb microwave energy not absorbed by the product.

The disadvantages of the above-described systems, which require the entire fluidized bed vessel to be formed as a waveguide, is that all of the microwaves are propagated along the path of the product and any remaining energy which has not been absorbed by the product is absorbed at the end of the microwave transmission path by the load tubes. Thus, no reflected waves occur and no standing waves exist. Such applications are inefficient since energy not absorbed by the load is lost in the load tubes. Moreover, in these prior art types of traveling wave applicators, the product to be treated is positioned in a region of maximum electric field which assists in maximizing absorbtion but limits design flexibility because the product must remain at a relatively precise location in the waveguide. Since the maximum electric field occurs substantially in the center of the waveguide, the product supporting screen is positioned near this center line and thus the area beneath the screen must also serve as part of the waveguide. As a result, much of the microwave energy propagated along the waveguide length is propagated below the screen and, of course, below the product being fluidized thus providing for an inefficient use of the microwave energy.

The remodelling of a conventional batch fluidized bed dryer to accommodate the use of microwave power in addition to hot air is mentioned in Rzepecka, M. H., Hamid, M. A., and McConnell, M. B., "Microwave Fluidized Bed Dyrer", Microwave Power Symposium, 10th Ann. Proc., University of Waterloo, Ont., May 1975, pp. 297–299. The article refers to a circular cylindrical drying chamber and notes that circular cylindrical cavities have been used as multimode resonators in microwave power processing. The arrangement of the drying chamber vis a vis the microwave energy source is not described.

SUMMARY OF THE INVENTION

The present invention provides for a novel microwave assisted fluidized bed processor system, specifically a batch type processor system, capable of utilization with a wide variety of products to be treated. The system comprises a fluidized bed vessel having a fluidized gas inlet and a fluidized gas outlet with a product supporting plate or screen position adjacent the gas inlet for supporting the product to be fluidized. The vessel includes a microwave entranceway for imparting microwave energy to the interior of the vessel, above the product supporting element wherein at least a portion of the fluidized bed vessel defines a microwave cavity for enabling variously-oriented, reflected microwaves to substantially fill the interior of the vessel in the region of fluidization. The product supporting element serves as a microwave protective screen to prevent escape of microwave energy below the screen.

The microwave delivery system between the generator and the vessel includes a tuner to match the generator to the load within the fluidized bed processor thus maximizing the energy to be absorbed by the fluidized bed product. Tuning enables maximization for a wide variety of products and thus provides flexibility to the system.

It is an object of the present invention to provide a microwave assisted fluidized bed processor wherein at least that portion of the fluidized bed processor in which the fluidized bed is formed defines a microwave cavity where reflected microwave energy is variously oriented within the vessel so that the vessel is filled with multi-mode standing microwaves through which the fluidized particles are passed. Although some dead zones as well as hot spots may occur, the microwave energy occupies substantially all of the cavity volume and is not confined to any specific location.

It is a further object of the present invention to utilize microwave energy in conjuction with well-known fluidized bed processors that are configured in accordance with conventional fluidized bed design technology without regard to microwave wave guide configurations. Such a design enables existing fluidized bed processors to be easily retrofitted to accomodate microwave generation.

Still further, it is an object of the present invention to efficiently apply microwave energy to a fluidized bed processor wherein substantially all of the microwave energy is confined to the region of fluidization.

It is further an object of the present invention to provide microwave energy to a batch-type fluidized bed processor capable of processing a wide variety of products. The microwave energy applied to the processor can be tuned to maximize the absorbtion depending upon the product to be processed.

These and other objects of the invention will become readily apparent when reference is made to the accompanying description and drawings.

DETAILED DESCRIPTION OF A PREFERRED EMBODIMENT

Figure 1:
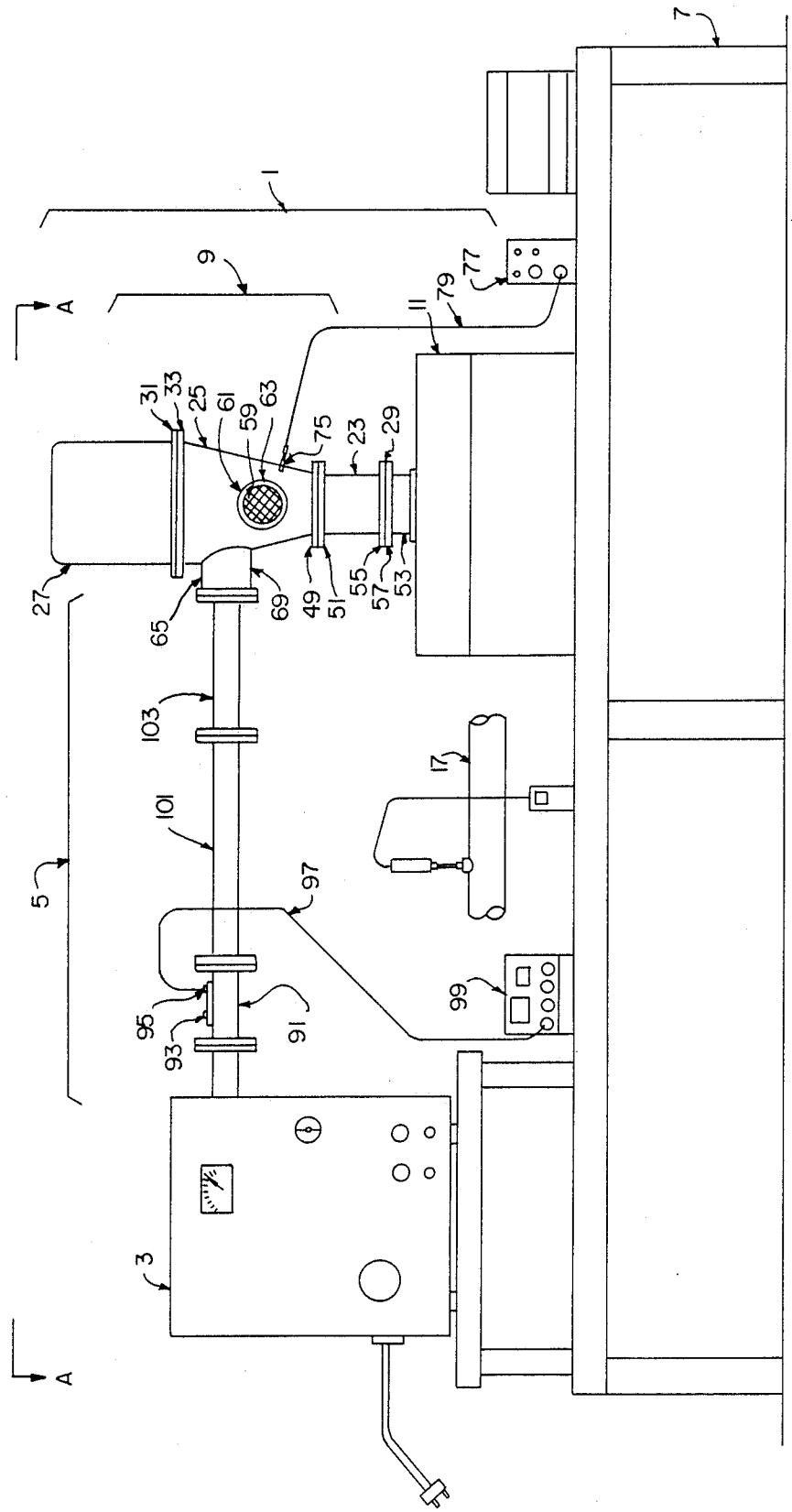
FIG. 1 shows the overall microwave assisted fluidized bed processing system.
Figure 2:
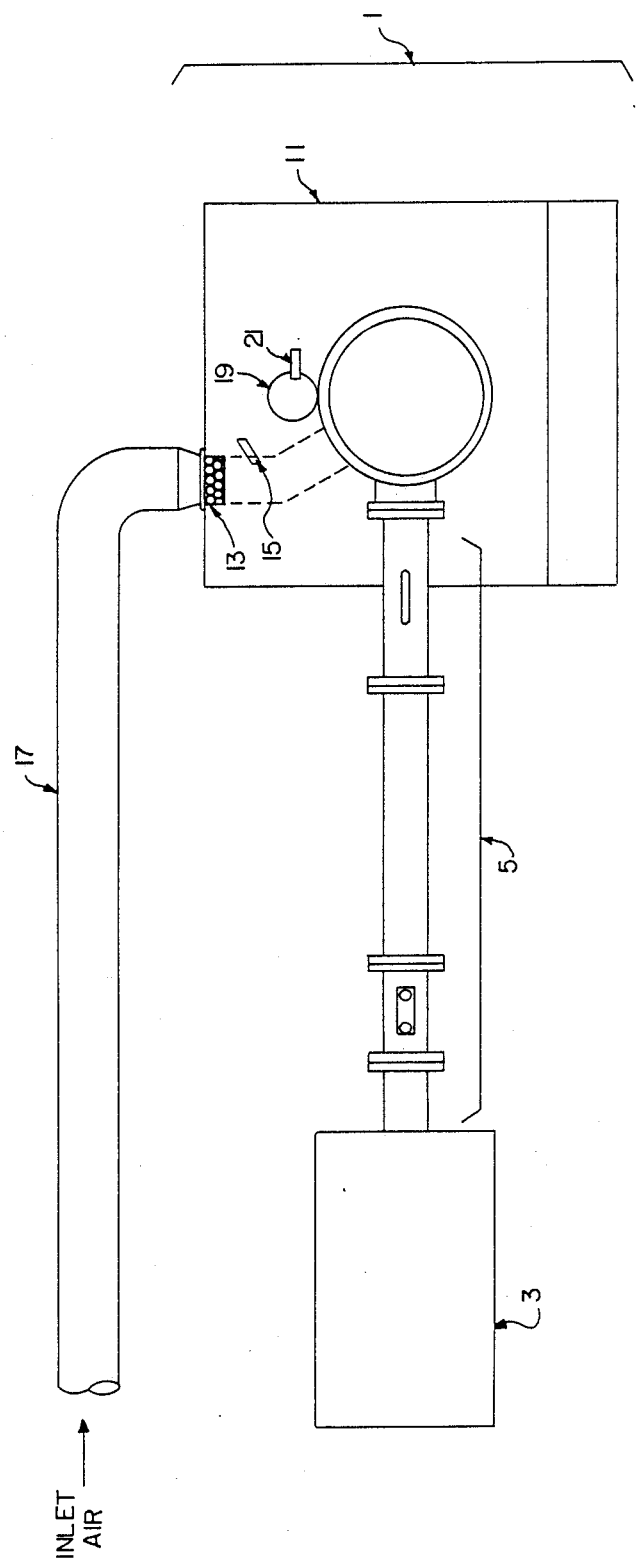
FIG. 2 is a partial top or plan view of the system of FIG. 1.
Figure 5:
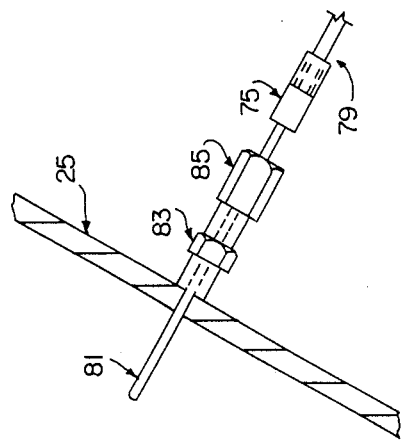
FIG. 5 depicts the temperature probe within the expansion chamber.
Figure 4:
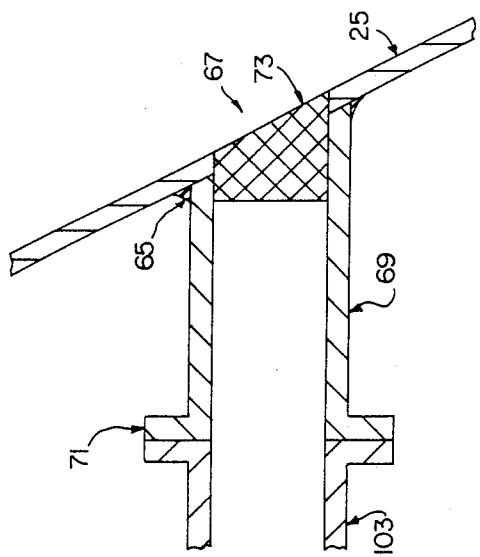
FIG. 4 depicts the microwave passage port, or microwave entranceway.

The overall microwave assisted fluidized bed processing system of the present invention, as depicted in FIG. 1, includes, generally, a fluidized bed unit 1 with associated control and display devices, a microwave generator 3 for generating microwave power, and a microwave delivery system 5 for delivering the microwaves to the fluidized bed unit. The specific system depicted utilizes a fluidized bed unit 1 sized for laboratory use, and thus is shown mounted on a work table 7. However, the present invention is by no means limited to the laboratory environment and, indeed, the invention encompasses the use of microwave assistance in all types of batch type fluidized bed processors including dryers, coaters, and agglomerators as are well known in the art. The invention is particularly appropriate for batch-type fluidized bed processors equipped to dry, granulate, or apply aqueous and nonaqueous films or powders to any substrate (food, drug, or nonfood substrates) and which permits heated or unheated, conditioned or non-conditioned, fluidizing gas, such as air or nitrogen, to enter and exit, or recirculate in, the fluidized bed unit.

The fluidized bed unit 1 may be a basic laboratory size (approximately 1 kg) fluidized bed dryer/granulator. One such unit is the "Uni-Glatt" model no. 4245 distributed by the Glatt Air Techniques, Inc., but modified in a manner to be described to accomodate the introduction of microwave energy into the fluidized bed vessel. The fluidized bed unit 1 includes a fluidized bed vessel 9 and a control cabinet 11, both known in the art in their unmodified form. The control cabinet 11 includes a fluidizing gas fan or pump (not shown) to draw gas or air upwardly through the fluidized bed vessel 9 to form a fluidized bed of particulate matter to be treated in a manner well-known in the art. Within the control cabinet 11 is a heating coil 13 to heat the inlet air, and an inlet temperature probe 15 for detecting the temperature of the heated inlet air. An air inlet tube or pipe 17 enters into the control cabinet 11 and the air is supplied to the bottom of the vessel after being heated. An exhaust tube or pipe 19 is provided for receiving the air drawn from the top portion of the fluidized bed vessel; the pipe 19 extends downwardly into the cabinet 11 where the air is then exhausted or may be recirculated with the input air. An outlet temperature probe 21 is shown schematically for detecting the outlet air temperature. These overall features are generally standard on fluidized bed systems and need not be described in detail herein.

The fluidized bed vessel includes three (3) major components; a product container or loading bowl 23, an expansion chamber 25, and a filter chamber 27. The product container 23, at its bottommost end, includes a product retaining screen 29 which, in the present invention also functions as a security screen for preventing microwave energy from escaping from the fluidized bed vessel. The product retaining screen 29 supports or retains the product to be fluidized and includes sufficient openings to enable the inlet air, i.e., the fluidizing air, to be drawn therethrough and upward to fluidize the product. The product container 23 is removable from the expansion chamber 25 to enable the product to be treated to be loaded and to enable the treated product to be removed at the conclusion of the fluidizing process. During a fluidizing operation, the fluidized bed, or area of fluidization extends throughout the product container 23 and into substantially two-thirds the distance up into the expansion chamber 25. Above the expansion chamber 25 is the filter chamber, or housing, 27 which includes therewithin a cloth filter bag (not shown) for preventing certain lightweight particles from escaping out of the fluidized bed vessel, and into the exhaust duct, and includes, preferably, a mechanical shaking apparatus (not shown) or other means for shaking or vibrating the filter bag to allow any entrained product to fall back into the fluidized bed. The exhaust air is drawn from the filter chamber through exhaust pipe or duct 19. The fluidized bed technology recognizes many modifications to the above-described basic system including a closed loop system wherein the exhaust air is recirculated to the inlet thus allowing no gas or air to escape into the environment and further recognizes a vacuum type arrangement wherein the fluidized bed components are maintained below atmospheric pressure.

As will be described further below, portions of the fluidized bed vessel act as a resonant cavity for microwave energy. The product container 23 and expansion chamber 25 define the cavity and must be metallic, such as stainless steel, for reflective purposes and must be relatively arc-free, i.e., must be smooth and without any burrs where arcing can occur resulting from the microwave energy imparted therein. That is, the cavity receiving the microwave energy must be an electrical continuum, i.e., an area that includes no non-conductive gaps which could cause arcing. Further, the cavity must be designed to prevent escape of microwave energy therefrom, both for environmental and safety reasons, as well as to prevent arcing. For example, if microwave energy were allowed to escape from the expansion chamber 25 into the filter chamber 27, the variously shaped metallic pieces, within the filter chamber could cause arcing to occur. Thus, security screening is required at the inlet to the product container 23 and the outlet from the expansion chamber 25 to the filter chamber 27. Further, all couplings between the three chambers must be designed to provide an electrical continuum to prevent arcing within the interior of the vessel.

Moreover, it is important that the vessel cavity, at least the expansion chamber 25 where substantial fluidization takes place, be sufficiently sized to enable the microwave energy directed therein to be reflected at various angles so as to substantially fill the expansion chamber 25 with microwave energy. The variously reflected microwaves form standing waves of multiple modes within the expansion chamber. These modes are created by the variously reflected microwaves bouncing back and forth from the internal walls of the expansion chamber. These microwaves reinforce each other (increase in amplitude) in some areas and cancel each other out in other areas. Thus, a plurality of standing waves are created. The larger the cavity, the more opportunity for reflections and the greater opportunity for a standing wave pattern to be established. Although hot-spots are created, as is typical in microwave heating, no mode stirrers are required, as is conventional in microwave ovens, for example, since the particles or product to be fluidized moves randomly through the standing wave pattern that is created thus uniformly treating the fluidized bed with the microwave energy.

In the specific embodiment depicted in the drawings, the expansion chamber 25 and the product container 23 are conically shaped. This conical shape enables the microwaves to bounce off the walls of the chambers with a vertical component to assist in substantially filling the chambers with microwave energy.

The filter chamber 27 is coupled to the expansion chamber 25 through annular flanges 31, 33 that extend circumferentially around the two chambers. The annular flanges are bolted together (not shown). Clamped between the flanges is a microwave security screen 35 for preventing microwaves from escaping from the expansion chamber 25 into the filter chamber 27. This security screen 35 must have sufficient openings 37 to permit the fluidizing gas to be drawn therethrough. In the present case, it has been determined desirable that substantially 79% of the screen must be open to permit sufficient air flow. Microwave security screens are well-known in the art. As is well-known in such screen designs, there exists a relationship between the openings in the screen and the thickness of the screen to prevent microwave transmission therethrough. The security screen may be a metallic, such as stainless steel or aluminum, perforated plate 39, of non-woven flexible metallic material with one quarter inch hexagonal openings 37. The thickness of the plate is approximately one sixteenth inch. The openings 37 allow adequate microwave protection but do not inhibit sufficient air flow from the expansion chamber 25 to the filter chamber 27.

Figure 3:
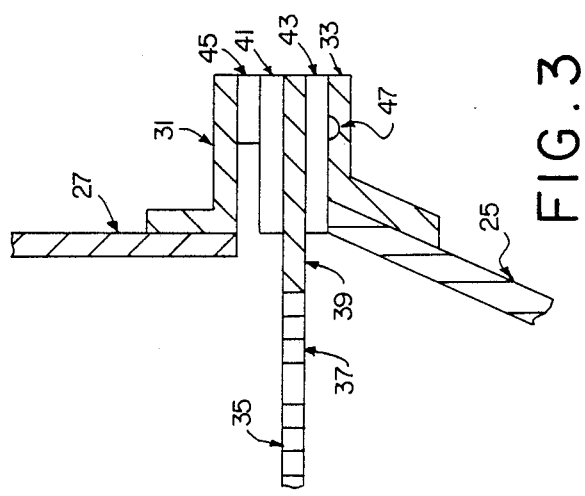
FIG. 3 depicts the coupling between the expansion chamber and the filter chamber.
Figure 6A:
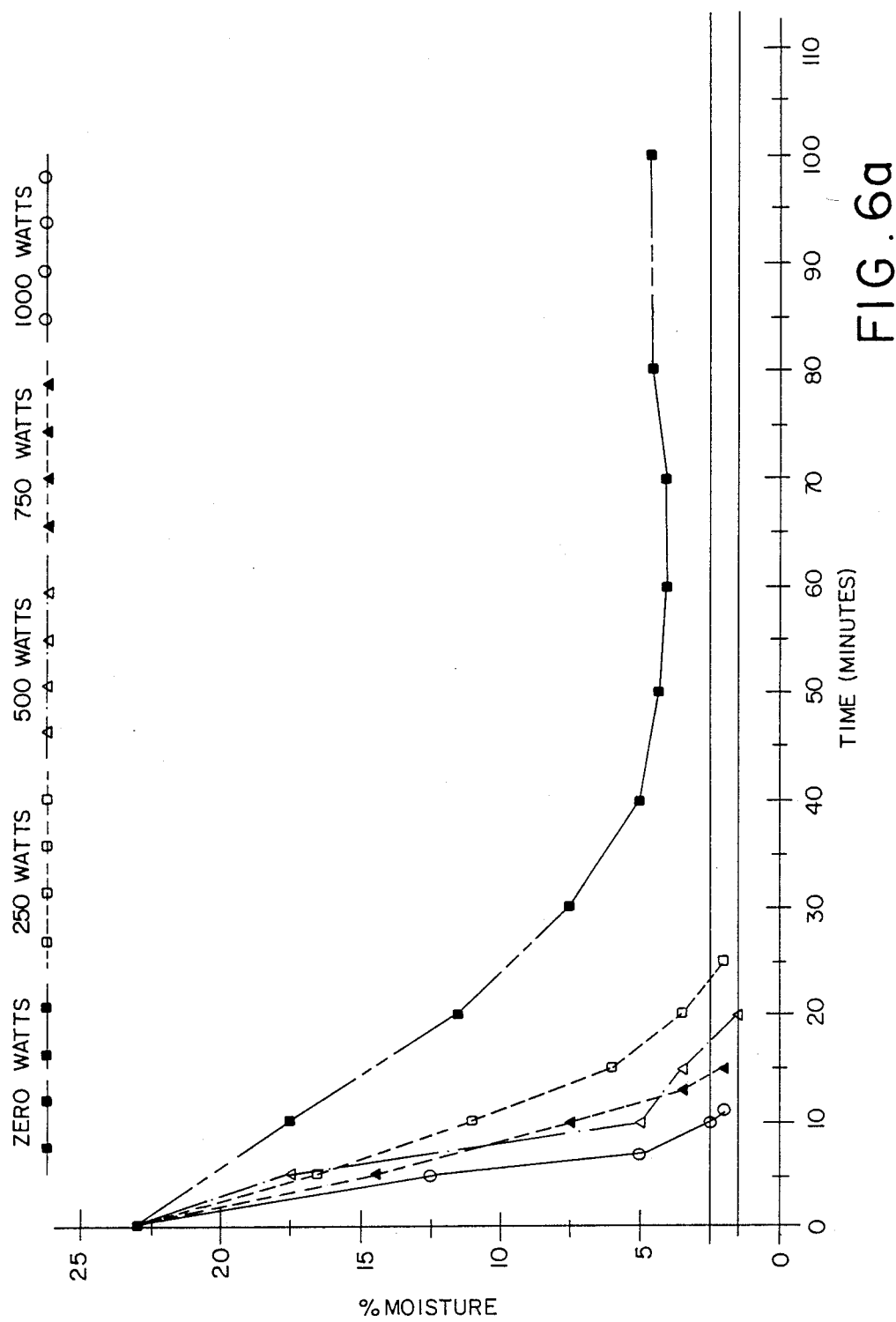
FIGS. 6(a)-(d) are graphs of the percent moisture versus time for four product formulations at various microwave energy inputs.
Figure 6B:
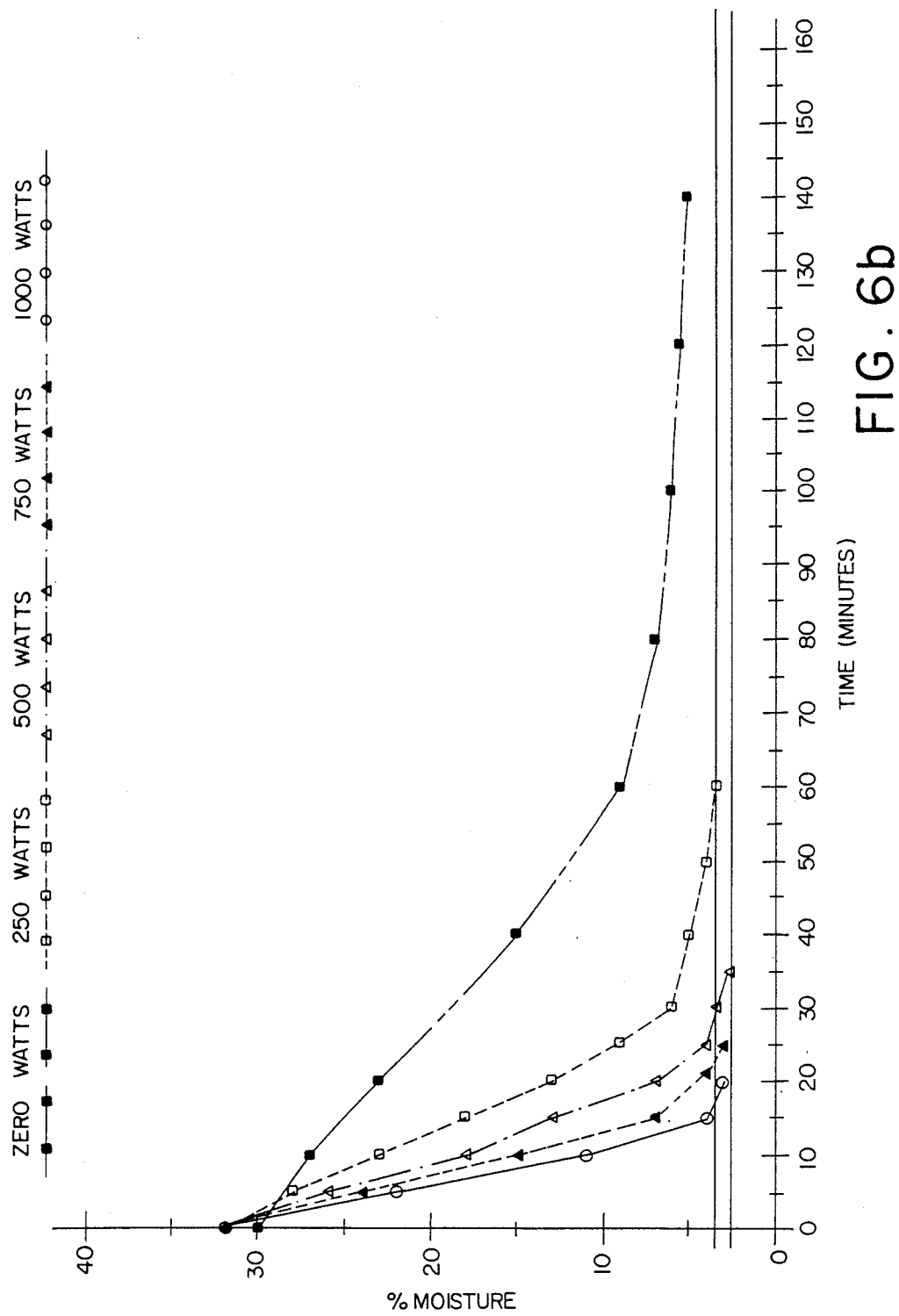
Figure 6C:
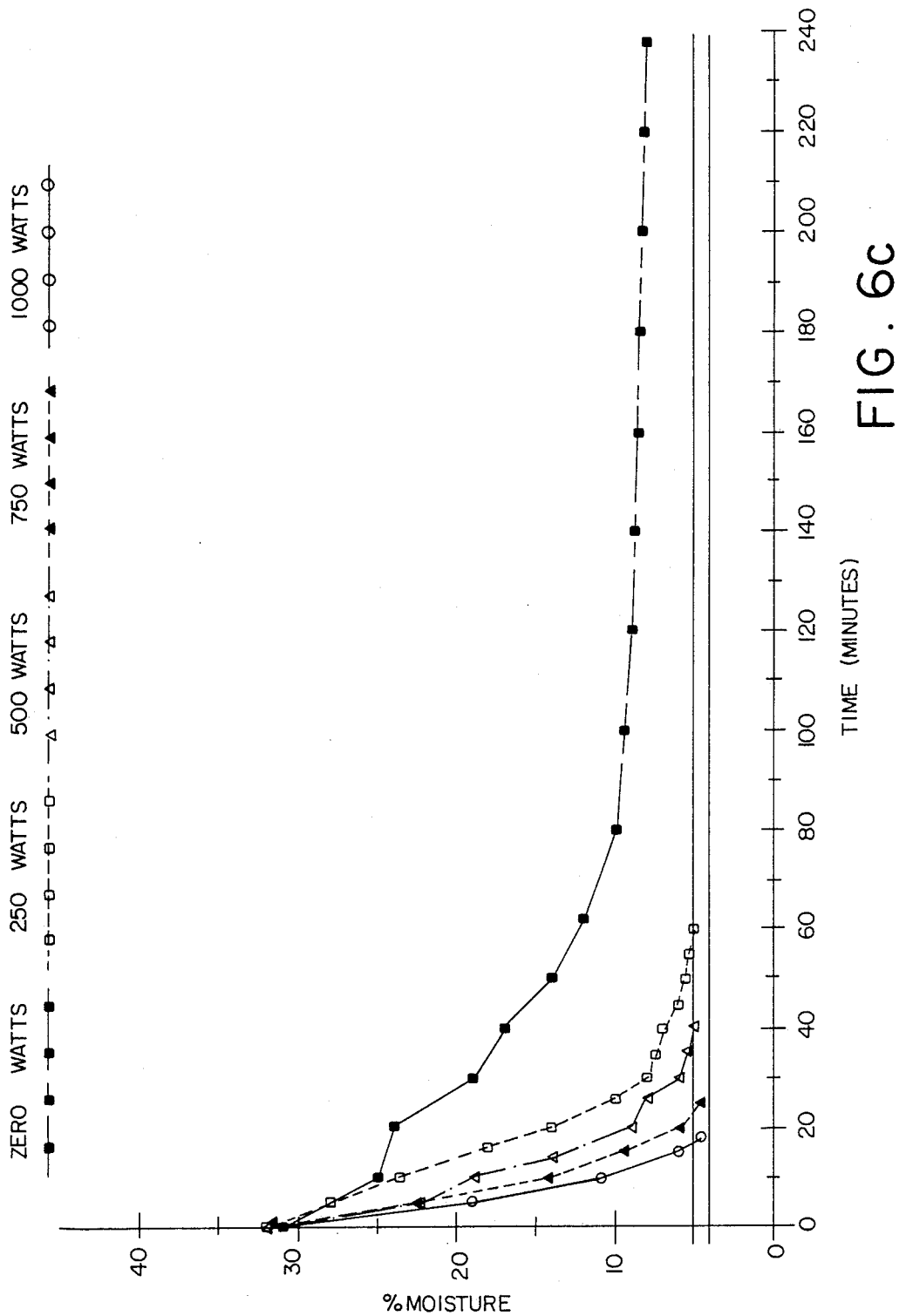
Figure 6D:
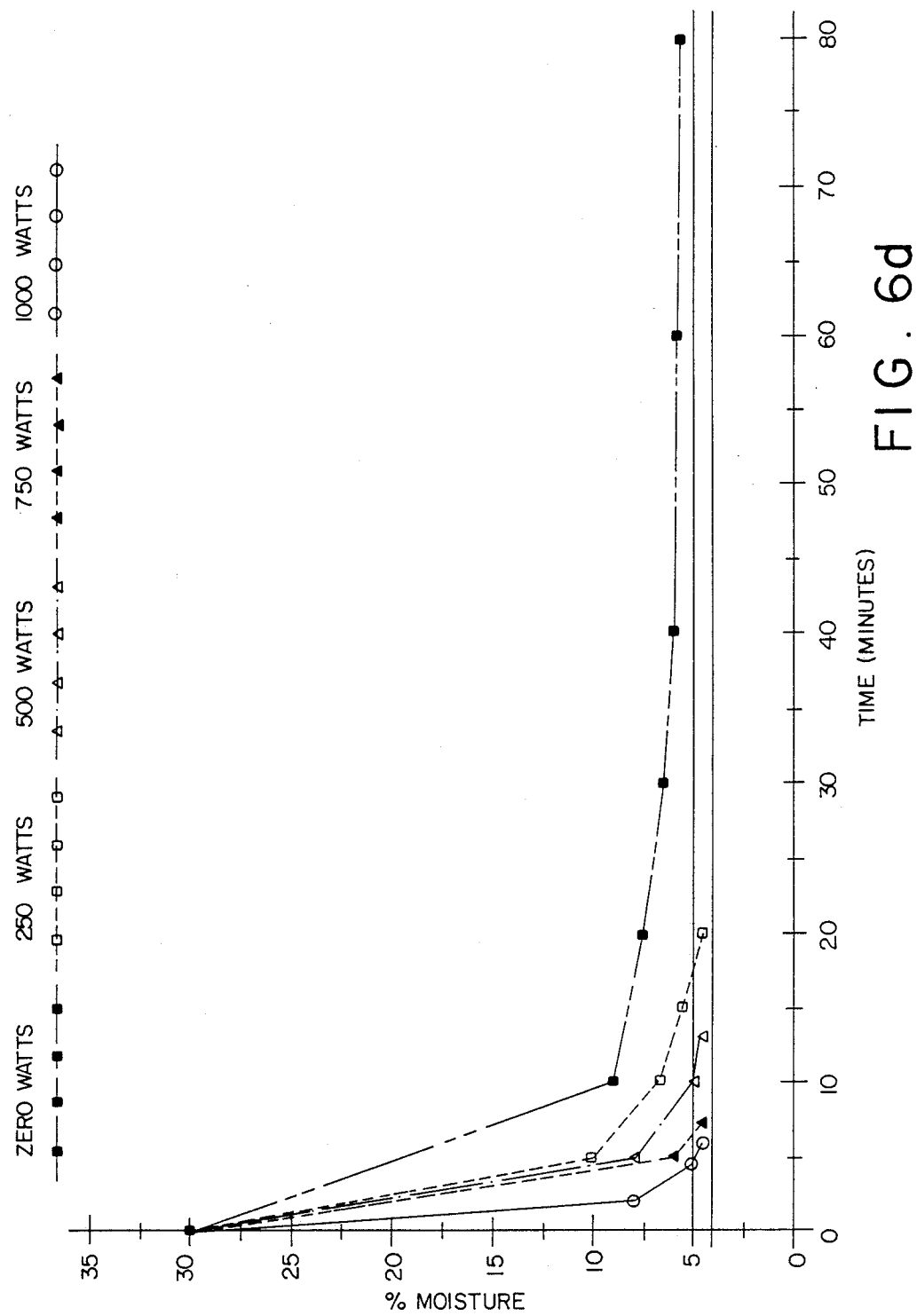

In order to maintain an electrical continuum, i.e., to minimize any gaps where arcing can occur at the coupling of the security screen with the chambers, the coupling arrangement as shown in FIG. 3 may be used. Two metallic rings 41, 43, of annular shape are welded to, and sandwich, the security screen 35 on opposite sides. These rings 41, 43, are of the same outer and inner diameter as the expansion chamber and flanges. The rings are metallic, such as stainless steel or aluminum, since such metallic elements do not transmit microwave energy. The rings also serve to keep the screen 35 secure. Disposed on opposite sides of the metallic rings are gaskets 45, 47. On the expansion chamber 25 side, the flange 33 includes a recess with an O-ring gasket 47; on the filter chamber 27 side is a rectangular annular gasket 45. These gaskets 45, 47 are compressible silicone gaskets with metallic particles, such as silver-plated aluminum, impregnated therein to provide an electrical continuum. One particular gasket material that may be used is made by Chomerics, identified by their Cho-Sil tradename. The gaskets 45, 47 are held in position by means of a special metal impregnated silicone-based adhesive known as Cho-Bond.

The expansion chamber 25 is coupled to the product container 23 also through annular flanges 49, 51 is a manner known in the art. In order to ensure an electrical continuum between the flanges 49, 51, an O-ring gasket of the same type of compressible material as the gasket 47 is bonded therebetween. The expansion chamber includes an annular recess for accomodating the O-ring (not shown). Again, the Cho-Bond brand glue is used to secure the gasket within the channel.

The bottommost end of the product container 23, connected to an inlet gas duct 53 from the control cabinet 11 also includes an annular flange 55 coupled to a flange 57 on the duct 53. The product retaining screen 29 may be a woven dutch weave 100 mesh screen of the same type typically used in the Uni-Glatt system. Through observation, it was determined that this particular type of screen did not cause arcing by the microwave field. The screen 29 is designed to permit substantial air flow therethrough into the product container 23 and is sized to serve as a microwave security screen to prevent microwave energy from escaping. Of course, should electrical arcing be observed, preventive measures can be taken in the same manner as described above. That is, specialty gaskets, of electrically conductive impregnated material may be provided along with metallic O-rings bonded to the screen to maintain the electrical continuum.

As is frequently used in fluidized bed vessels, a viewing window 59 is provided in the expansion chamber 25 to enable the operator to view the fluidized bed process. Typically, the viewing window 59 includes a glass window that is sandwiched between the wall of the expansion chamber and a metallic annular plate 61 to retain the glass in a position over a circular opening in the chamber wall. In order to maintain the use of a viewing window when adapting the fluidized bed vessel to receive microwave energy, a security screen 63 must be positioned adjacent the window to prevent the escape of microwave energy, as is well-known in the microwave heating or drying art. The security screen 63, which may be of the same general dimensions as discussed above, is cut to a diameter slightly larger than the diameter of the glass window and the metallic plate 61 that secures the window also secures the security screen. Thus, the plate 61 is in contact with the screen 63, which is, in turn, in contact with the wall of the vessel to maintain an electrical continuum. Silicone should preferably be used as a sealant to maintain an air tight fitting and to maintain the metal-to-metal contact between the screen 63, metal retaining ring 61, and vessel 25.

A microwave entranceway 65 must be provided in the wall of the fluidized bed vessel, preferably in the expansion chamber 25 to maximize the reflections of microwave energy and increase the number of modes within the vessel. A circular hole 67 is drilled in the expansion chamber 25 wall, approximately two-thirds the way up toward the filter chamber 27. Although only one microwave entranceway 65 is depicted, it should be apparent that a plurality of entranceways, disposed at predetermined angles from each other around the entire periphery of the expansion chamber 25 may be provided. A stainless steel pipe 69 is welded to the exterior of the expansion chamber 25 having an appropriate annular flange 71 for connection with the microwave delivery system to be described below. A solid Teflon plug 73 is firmly positioned within the pipe and fills the microwave entranceway. Teflon is chosen because of its inertness, machinability and its ability to permit microwaves to propagate with little distortion. The plug 73 is milled from a solid block of Teflon to close tolerances so as to provide a snug circular contoured fit to conform to the shape and curvature of the expansion chamber 25. The Teflon plug, on the expansion chamber internal side, is contoured to match the curvature of the expansion chamber 25 and extends cylindrically into the metallic tube or pipe 69 a sufficient distance. A hole (not shown) may be tapped through the pipe 69 and into the Teflon block 73 to accomodate insertion of a Teflon bolt (not shown) to inhibit any rotation of the Teflon plug 73. It should be noted that the surfaces and joints of the pipe should be finely ground and polished to produce a sanitary and arc-free design.

In order to monitor the temperature of the fluidized product, a probe, preferably a thermocouple probe 75 is provided through the walls of the expansion chamber 25. (Other types of probes may be used, such as fiber optic probes.) One such thermocouple probe that may be used is a cylindrical, type K, bimetal probe (model no. N8439 of Cole-Palmer Electronics). The probe 75 is an eighth inch outer diameter and twelve inches in length. The probe 75 may be connected to a read-out device such as a digital thermometer 77. The connecting cable 79 between the probe 75 and the thermometer 77 may be wrapped in metallic tape to minimize any interference that may occur at very low microwave power ranges.

The thermocouple probe 75 is inserted into a stainless steel protection tube 81 welded to the lower quadrant of the expansion chamber 25 and disposed inwardly into th expansion chamber. At an end of the tube 81, the exterior of the expansion chamber 25, is a conventional compression fitting 83, such as a National Pipe Thread (NPT) compression fitting, which provides a secure and precise penetration depth for the thermocouple probe 75 within the protection tube 81. This NPT compression fitting 83, well-known in the art, not only provides immobilization of the temperature probe 75, but it ensures the necessary electrical continuum inside the microwave drying area. A locking nut 85 is provided to secure the probe in position.

It is known that the insertion of a metal cylinder, such as a protection tube 81, into a microwave field results in the tube acting as either an antenna or anti-antenna to the microwave energy and thus potentially results in false and erroneous temperature readings, or, in worse cases, permanent damage to the digital thermometer 77 that is connected to the probe. Thus, it is necessary that the thermocouple probe 75 be positioned at a precise penetration depth, determined experimentally, to enable accurate temperature readings. The positioning can be determined experimentally as follows. By providing a one liter load of water in the product loading container 23, and an input of 100 watts of microwave power, the position of the thermocouple probe 75 can be adjusted to varying depths until a low fluctuating and "true" reading is obtained. The "true" temperature is that temperature within the expansion chamber without the microwave energy. Thus, one first measures the temperature within the chamber without the microwave source, applies the microwave energy and adjusts the position of the thermocouple probe 75 until the same temperature is reached.

Turning next to the microwave energy source, a microwave generator 3, of conventional design, is depicted. In the particular embodiment described herein, the microwave generator is manufactured by Associated Sciences Research Foundation, Inc., model no. RES 131, and is designed to provide a variable power output from 0 to approximately 1300 watts. The frequency provided by the generator 3 is a constant 2450 MHz (plus or minus 15 MHz) In essence, any standard microwave generator, or series of generators, with constant or variable energy output may be used. Variable energy output may be provided in a number of different ways. For example, variable energy output may be provided by a rheostat which changes the voltage applied to a magnetron within the microwave generator 3 and therefore changes the power wattage that the generator 3 may provide. Variable energy may also be attained by using a plurality of constant and/or variable energy microwave generators that may be selectively actuated to achieve different total energy input into the fluidized bed processor. The plurality of microwave generators may be connected to a single microwave delivery system 5, as will be described below, or separate microwave generators may be connected with separate delivery systems coupled to separate microwave entranceways.

The microwaves generated by the microwave generator 3 are applied to the fluidized bed vessel via a microwave delivery system 5. The microwave delivery system 5 includes, first, a bidirectional coupler 91 (such as manufactured by Associated Sciences Research Foundation, Inc.). Bidirectional couplers 91 are well-known in the art and permit easy and rapid monitoring of the forward and reverse microwave energy. That is, the bidirectional coupler detects the forward power, i.e., the power provided into the expansion chamber 25 as well as the reverse power, i.e., the unused energy that is reflected back from the fluidized bed vessel. The reverse energy is that energy that is not absorbed by the product being treated. The forward coupler 93 may be equipped to provide minus 60 decibel attenuation and the reverse coupler 95 equipped to attenuate the signal by minus 50 decibel. The sensing and transference of the attenuated microwave energy may be via a temperature compensated thermistor and coaxial cable 97 connected to a power meter 99, such as a standard Hewlett-Packard power meter model no. 431 C. The temperature compensated thermistor (within the cable) and coaxial cable 97 may be model no. GIL-360-2 manufactured by Struthers Electronics. The purpose of the forward coupler is to accurately measure the microwave power wattage into the fluidized bed processor. It is also used to calibrate and validate the microwave generator. The primary function of the reverse coupler is to measure the amount of reflected or unused microwave energy at any given time during the fluidizing process. It has been found that the reflected energy is proportional to the degree of dryness, of the material being processed. That is, during the initial stages of fluidized bed processing, substantially all of the microwave energy provided to the vessel is absorbed by the product. As the process continues, and the product gets dryer, less of the energy gets absorbed and thus more energy is reflected back out through the microwave entranceway 65, through the microwave delivery system 5, and is detected by the bidirectional coupler 91 and power meter 99. By monitoring the reverse power, one can determine the dryness of the material. That is, the higher the reverse power, the more energy is unabsorbed, which means that less moisture or water is present in the product material. Thus monitoring for the completion of the drying process may be made by monitoring the reverse energy out from the fluidizing bed vessel.

Connected to the bidirectional coupler 91 is a flexible waveguide 101. One such flexible waveguide 101 that may be used is a standard 18" flexible waveguide manufactured by Associated Sciences Research Foundation, Inc. The use of a flexible waveguide 101 is desirable to enable an easier installation by eliminating the painstaking job of perfectly levelling the microwave generator 3 and the fluidized bed processor 9. The flexible waveguide 101 is connected to a tuner, such as a slotted tuner 103 to be described.

It should be noted that the flexible waveguide 101 may be of many configurations and may include twists, such as a 90° twist to orient the microwaves in particular directions into the fluidized bed vessel. By varying the waveguide 101 orientation prior to entrance into the expansion chamber 25, repositioning of the energy modes within the expansion chamber 25 resulting from changing the angular reflections of the microwaves within the expansion chamber 25 are possible. Further, the flexible waveguide 101 and the slotted tuner 103 may be rotatable with respect to the flange 71 of the pipe 69 connected to the microwave entranceway to enable changing the orientation of the microwaves into the expansion chamber 25.

The final component of the microwave delivery system is the tuner, which may be a slotted tuner 103, a well-known component. In essence, the slotted tuner 103 is a waveguide having a slot with a brass screw that moves within the slot to reflect energy back into the expansion chamber 25. By adjusting the slotted tuner for a particular product load, one can maximize the amount of energy absorbed by the material. Stated otherwise, the slotted tuner 103 permits adjustment to minimize the reverse power reflected out of the expansion chamber 25. Thus, the tuner 103 is used to match the microwave power input with the product load present in the fluidized bed processor. This is determined experimentally in advance of performing a processing operation for a particular type of product. Adjustment of the slotted tuner 103 is made prior to each process for a particular product formulation. A test load of the product formulation is provided within the product container 23, microwave energy is applied thereto, and the tuner 101 is adjusted to an optimum position to minimize the amount of reflected energy observed by the power meter.

The inlet gas or air drawn or blown upwardly through the fluidized bed processor is provided via the inlet tube 17 having its free end in communication with the atmosphere. It is frequently desirable, particularly for test purposes, to be able to measure the volume of air drawn into the fluidized bed processor. Accordingly, the inlet air tube 17 may be a straight length of duct having an electronic vaned anemometer therein (not shown) for measuring the volume of air, in cubic feet per minute, in a manner well-known in the art.

The application of microwave energy to conventional batch-type fluidized bed processors modified as discussed above results in substantial decreases in drying time. An example of the advantages are shown with references to FIGS. 6(a)–(d). The microwave assisted fluidized bed processor as described above was used to dry four (4) typical pharmaceutical granulations. Drying experiments were performed at 30° inlet air temperatures and with and without microwave assistance. The type of granulations were carefully chosen so as to demonstrate the ability to dry a spectrum of pharmaceutical materials. Formulas A, B and C represent materials which exhibit low, medium and high hydroscopicity, respectively. Formula D, represents a nonaqueous granulation. The exact formulas are as follows:

| Formula | A (%) | B (%) | C (%) | D (%) |
|---|---|---|---|---|
| Pre-gelatinized Starch (Starch 1500, Colorcon Corp.) | 0 | 37.5 | 75 | 75 |
| Calcium Phosphate dihydrate Unmilled (Stauffer Chemical) | 75 | 37.5 | 0 | 0 |
| Microcrystalline Cellulose (Avicel pH 101, FMC Corp.) | 20 | 20 | 20 | 20 |
| Polyvinylpyrrollidone (PVP k29-32, GAF Corp.) | 5 | 5 | 5 | 5 |
| Granulating Agent | Purified Water | Purified Water | Purified Water | Isopropyl Alcohol |

Four (4) microwave power inputs were used. These were 250, 500, 750 and 1000 watts. FIGS. 6(a)–(d) graphically represent the dramatic improvement of drying times for each formula at a 30° C. air inlet temperature. At the 30° C. air inlet temperature, in all cases, the final residual moisture specification could not be met without microwave assistance. Similar experiments on these product formulations were conducted at a 60° C. inlet air temperature. In the case where 60° C. air was employed, although moisture specifications were met in all cases, drying rates were improved 2 to 4 times with the input of microwave energy.

Scanning electron microscopy was employed to detect any physical differences between the granulations dried with and without microwave input. Results showed no changes in granule morphology, e.g., particle size, pore volume, surface area, or general physical make-up. Therefore, a logical conclusion could be made that microwave assistance will not significantly change the properties of existing pharmaceutical granulations that are dried using conventional fluid bed technology.

What is claimed is:

1. A microwave assisted fluidized bed processor comprising:
   a fluidized bed vessel having a fluidizing gas inlet, a fluidizing gas outlet, a product supporting means positioned adjacent said fluidizing gas inlet for supporting the product to be fluidized, and a microwave passage port, wherein at least a portion of said fluidized bed vessel above said product supporting means defines a microwave cavity for enabling variously-oriented, reflected microwaves to be produced within a region of fluidization; and
   microwave generating means for providing microwave energy into the fluidized bed vessel via said microwave passage port, said microwave passage port further providing a passage for unabsorbed reflected microwave energy from said fluidized bed vessel, said microwave generating means including tuning means for maximizing the microwave energy to be absorbed by the fluidized product.

2. The fluidized bed processor of claim 1 wherein said microwave generating means includes means for measuring the unabsorbed reflected microwave energy from said fluidized bed vessel, wherein said tuning means is adjustable to minimize the reflected microwave energy.

3. The microwave assisted fluidized bed processor of claim 1 wherein said portion of said fluidized bed vessel that defines a microwave cavity is an electrical continuum.

4. The microwave assisted fluidized bed processor of claim 3 wherein said fluidized bed vessel includes screening means for preventing escape of microwave energy from said portion of said fluidized bed vessel.

5. A microwave assisted fluidized bed processor comprising:
   a fluidized bed vessel having a fluidizing gas inlet, a fluidizing gas outlet, a product supporting means positioned adjacent said fluidizing gas inlet for supporting the product to be fluidized, and a microwave passage port, wherein at least a portion of said fluidized bed vessel above said product supporting means defines a microwave cavity for enabling variously-oriented, reflected microwaves to be produced within a region of fluidization; and
   microwave generating means for providing microwave energy into the fluidized bed vessel via said microwave passage port, said microwave generating means including tuning means for maximizing the microwave energy to be absorbed by the fluidized product, wherein said tuning means includes means for adjusting the microwave energy for a variety of fluidized products.

6. A microwave assisted fluidized bed processor comprising:
   a fluidized bed vessel having an expansion chamber, a product container positioned at one end of said expansion chamber, said product container having a fluidizing gas inlet, and a filter chamber positioned at the other end of said expansion chamber, said filter chamber having a fluidizing gas outlet, said expansion chamber and product container defining an electrical continuum, and wherein said expansion chamber is dimensioned to enable variously-oriented reflected microwaves to be produced within said expansion chamber;
   a microwave security screening means positioned at said other end of said expansion chamber for preventing escape of microwave energy into said filter chamber;
   a product retaining/screening means positioned at said fluidizing gas inlet of said product container for retaining the product to be fluidized and for preventing escape of microwave energy from said product container;
   microwave generating means connected with said fluidized bed vessel for enabling variously-oriented microwaves to be provided within the interior of said fluidized bed vessel, in the vicinity of the expansion chamber, to create a microwave field within at least the interior of said expansion chamber.

7. The fluidized bed processor of claim 6 wherein said microwave generating means includes a microwave generator for generating microwaves, and transmission means for transmitting the microwaves from said microwave generator to said fluidized bed vessel.

8. The fluidized bed processor of claim 7 wherein said transmission means comprises a waveguide and a bi-directional coupling means for monitoring forward microwave energy transmitted toward the fluidized bed vessel and reverse microwave energy reflected back from the fluidized bed vessel.

9. The fluidized bed processor of claim 8 wherein said bi-directional coupling means is connected with metering means for measuring the reverse microwave energy.

10. The fluidized bed processor of claim 8 wherein said waveguide is a flexible waveguide.

11. The fluidized bed processor of claim 8 wherein said transmission means further comprises tuning means for maximizing the forward microwave energy provided to said fluidized bed vessel.

12. The fluidized bed processor of claim 11 wherein said tuning means is a slotted tuner.

13. The fluidized bed processor of claim 6 wherein said fluidized bed vessel further comprises a microwave passageway formed of solid Teflon.

14. The fluidized bed processor of claim 13 wherein said microwave passageway is defined by a substantially circular opening in the expansion chamber wall with a solid Teflon plug fitted snugly within the opening.

15. The fluidized bed processor of claim 14 wherein said Teflon plug is contoured to the interior wall of the expansion chamber.

16. The fluidized bed processor of claim 7 further comprising a temperature probe extending through the expansion chamber wall a sufficient distance to prevent the probe acting as an antenna/anti-antenna for the microwave energy.

17. The fluidized bed processor of claim 6 further comprising inlet temperature sensing means for detecting the fluidizing gas temperature at said fluidizing gas inlet and outlet temperature sensing means for detecting the fluidizing gas temperature at said fluidizing gas outlet.

18. A microwave assisted batch-type fluidized bed processor comprising:
   a fluidized bed vessel having microwave passage port and a fluidizing gas outlet and including a removable product containing means for receiving a predetermined quantity of product to be fluidized without discharge of the product during fluidization, said product container means including a product supporting means positioned adjacent said fluidizing gas inlet wherein at least a portion of said fluidized bed vessel above said product supporting means defines a microwave cavity for enabling variously-oriented, reflected microwaves to be produced within a region of fluidization; and
   microwave generating means for providing microwave energy into the fluidized bed vessel via said microwave passage port, said microwave generating means including tuning means for maximizing the microwave energy to be absorbed by the fluidized product.

* * * * *